United States Patent [19]

Arora et al.

[11] Patent Number: 5,474,792
[45] Date of Patent: Dec. 12, 1995

[54] GASIFIED COFFEE PRODUCT AND PROCESS

[75] Inventors: Vijay K. Arora, Montvale; Rudolf A. Vitti, Dumont; Marshall M. Rankowitz, Englishtown, all of N.J.

[73] Assignee: Kraft Foods, Inc., Northfield, Ill.

[21] Appl. No.: 510,312

[22] Filed: Apr. 16, 1990

Related U.S. Application Data

[63] Continuation-in-part of Ser. No. 231,807, Aug. 12, 1988, abandoned.

[51] Int. Cl.$^6$ .............................................. A23F 5/36
[52] U.S. Cl. ..................... 426/594; 426/448; 426/388; 426/650; 426/651
[58] Field of Search ....................... 426/594, 650, 426/651, 448, 388

[56] References Cited

U.S. PATENT DOCUMENTS

| | | | |
|---|---|---|---|
| 1,240,020 | 9/1917 | Boberg et al. | |
| 2,457,036 | 12/1948 | Epstein | 99/71 |
| 2,816,840 | 12/1957 | Turkot et al. | 99/206 |
| 2,826,504 | 3/1958 | Chase et al. | 99/71 |
| 2,856,291 | 10/1958 | Schultz | 99/140 |
| 2,906,630 | 9/1959 | Turkot et al. | |
| 2,919,989 | 1/1960 | Schultz | 99/140 |
| 2,929,717 | 3/1960 | Eskew | |
| 3,041,180 | 6/1962 | Swisher | |
| 3,419,399 | 12/1968 | Earle, Jr. et al. | |
| 3,625,704 | 12/1971 | Andre et al. | |
| 3,652,293 | 3/1972 | Lombana et al. | 99/71 |
| 3,657,010 | 4/1972 | Mitchell et al. | 127/70 |
| 3,704,137 | 11/1972 | Beck | |
| 4,004,039 | 1/1977 | Shoaf et al. | 426/548 |
| 4,154,864 | 5/1979 | Risler et al. | 426/594 |
| 4,499,112 | 2/1985 | Miller et al. | 426/276 |
| 4,520,033 | 5/1985 | Tuot | 426/96 |
| 4,919,962 | 4/1990 | Arora et al. | 426/594 |

FOREIGN PATENT DOCUMENTS

| | | |
|---|---|---|
| 1278216 | 6/1972 | Canada. |
| 0158460 | 1/1988 | European Pat. Off.. |

OTHER PUBLICATIONS

Sivetz et al, Coffee Technology, 1979, Avi: Westpork, Conn., pp. 418–419, 439.

*Primary Examiner*—Joseph Golian
*Attorney, Agent, or Firm*—Thomas A. Marcoux; Thomas R. Savoie

[57] ABSTRACT

A gasified coffee glass is disclosed which is prepared by forming a mixture containing 3% to 12% water and about 88 to 97% total coffee derived solids, heating the mixture, injecting a gas into the mixture and mixing to form a uniform mixture, forcing the mixture through an orifice, and cooling the mixture to form a gasified coffee glass resembling dry soluble coffee or roasted and ground coffee or other novel gasified coffee products.

5 Claims, No Drawings

GASIFIED COFFEE PRODUCT AND PROCESS

This application is a continuation-in-part of application Ser. No. 07/231,807, filed Aug. 12, 1988, now abandoned.

BACKGROUND OF THE INVENTION

1. Technical Field

This invention relates to vegetable extracts, more specifically extracts of coffee and processes for producing such products. Coffee in the form of a high solids homogeneous melt is gasified, forced through an orifice and cooled to form a controlled light density coffee glass which when sized has the appearance of roasted and ground coffee, freeze-dried coffee or other useful appearances depending on the degree of gasification. The melt may be aromatized prior to formation of the desired shape. The product exiting the die may be stretched to control its final form. An object of this invention is to provide economical processes for shaping and preparing shelf-stable coffee products which have not suffered from heat damage and yet may be quickly reconstituted in hot water to yield coffee of excellent flavor and aroma. The process is particularly suitable for producing aromatized gasified coffee of controlled density and color which can be sized and dried to a stable condition without need for extensive freeze or spray drying. Such gasified soluble coffee glass can then be further treated, as by agglomeration, to form novel appearing products.

2. Prior Art

The present invention is concerned with the manufacture of vegetable extracts and, particularly, instant coffee. The manufacture of instant coffee involves extracting roasted and ground coffee beans with water under conditions of high temperature and pressure to form extracts which are dried with or without aromas added by known means, such as spray-drying, freeze-drying or the like.

In an early effort to avoid drying of such coffee extracts by Eskew, U.S. Pat. No. 2,989,717, issued Mar. 22, 1960, a fifty-fifty mixture of concentrated coffee extract and an invert sugar solution were concentrated in a thin film evaporator to form a product having four percent or less water which was pumped out of the evaporator and formed on chilling rolls into small flakes which were easily broken into a coarse product before packaging. In this process, the product temperatures exiting the evaporator ranged from 220° F. to 290° F. and the products produced had moisture contents of about 1 to 4% and were hygroscopic by reason of the addition of large amounts of invert sugars. This type of processing was also applied by Turkot, et al., U.S. Pat. No. 2,908,630, issued Sep. 29, 1959. While the process of Eskew and Turkot, et al. produced coffee products without the need to spray dry, a filler was employed which is not suitable in today's market. Furthermore, special packaging would be required to reduce the chance of moisture contamination which would be disastrous because of the hygroscopisity of the coffee product produced.

In another attempt, Earle Jr., et. al., U.S. Pat. No. 3,419,399 patented Dec. 31, 1968, prepared soluble coffee doughs having a moisture content of 9.5 to 12.5% at a temperature below 140° F. and then dried the dough to 1–4%. This material was very sticky and difficult to process.

Another attempt to produce dehydrated vegetable extracts is disclosed by Risler, et. al., U.S. Pat. No. 4,154,864, issued May 15, 1979. Risler, et. al. formed a paste or powder which is extruded into a subatmospheric pressure chamber to puff the coffee product. For example, freeze-dried instant coffee powder, having a moisture content of 2.5%, is extruded into a chamber at 80 mb and cut to form grains about the size of a pea which dissolve in cold water. When compared to these grains extruded into atmospheric pressure in Example 5 of that patent, the products with cellular internal structure are far more soluble.

In U.S. Pat. No. 3,625,704 to Andre, et al., issued Dec. 7, 1971, dense flakes of instant coffee are prepared and aromatized from roll-milled instant coffee.

In the field of flavor fixation, particularly of essential oils, a number of patents have issued which deal with forming a carbohydrate glass to protect the flavor. The U.S. Pat. No. 3,041,180 issued to Swisher discloses a method for fixing flavorants in an extruded carbohydrate substrate. The product of the Swisher invention is obtained by emulsifying an essentially water-insoluble essential oil with a molten mixture of glycerol and corn syrup solids as the continuous phase, extruding the emulsified mass in the form of filaments into a cold fluid, preferably an organic solvent for the essential oil which is a nonsolvent for the corn syrup solids, followed by impact breaking of the solidified filaments into small particles of usable form and then holding the particles in the solvent, preferably for an extended period, to remove essential oil from the surfaces of the particles together with a substantial portion of the residual moisture contained on and in the particles. This methodology is conducted in excess of 130° C.

U.S. Pat. No. 3,704,137 to Beck discloses a method for preparing an essential oil composition. His method involves the cooking of an aqueous solution of sucrose and hydrolyzed cereal solids until it is at a boiling point of about 122° C., and the water level reaches a desired minimum. At this point the heating is stopped, the mixture is agitated, and an emulsifier is added. The emulsifier is necessary in order for a homogeneous solution to form. While the solution is cooling, the essential oil and an antioxidant are added, and are intimately mixed. The final mix is forced through an extruder under air pressure. At this point, about 0.5% by weight of the final composition of an anticaking agent is added to prevent the particles from sticking.

U.S. Pat. No. 4,004,039 to Shoaf, et al. discloses a process for the encapsulation of "Aspartame" in any number of matrix forming materials. The product is formed by creating a hot melt which, upon cooling, is capable of forming a relatively amorphous matrix within which the sweetener is discretely dispersed.

EPO published patent application 0158460 to Pickup, et al., teaches a method for fixing volatile flavorants in a food-approved substrate, and, more particularly, to a low-temperature methodology for fixing volatile flavorants in an extruded "carbohydrate-glass" substrate. Volatiles or essential oils are dry blended with 10–30% low molecular weight carbohydrate food acid or the like and at least 70% of a high molecular weight polymeric carbohydrate which contains at least 95% material above 1000 molecular weight. The dry mixture is extruded to form on cooling a hard glass-like substance.

While these methods have enabled workers in the art to produce useful food products, they have not provided a means for producing aromatized coffee glass which is prepared from 100% coffee derived material.

SUMMARY OF THE INVENTION

It has been discovered that a stable instant coffee product can be prepared from a process which involves obtaining a mixture containing 3% to 12% water, preferably above 4% to 9% water, and about 88 to 97%, preferably 91% to about 96% total coffee derived solids by either concentrating conventionally extracted coffee or by reconstituting instant coffee products either spray-dried, freeze-dried or otherwise with water. Preferably, substantially all the final products are prepared from concentrated extract, thus avoiding the need to spray dry or freeze dry the extract. We have found this procedure retains more coffee flavor and volatiles. The coffee mixture obtained has a glass transition temperature of between 30° C. to 80° C. The mixture is heated to from 60° C. to 130° C., preferably 70° C. to 110° C., more preferably 80° C.–100° C. and gasified in a confined area with air, carbon dioxide or nitrogen or other suitable gaseous compounds or mixtures thereof. The mixture is then forced through a suitable orifice or shaping device under pressure to form it, cooled to protect flavor and aroma and then dried, if necessary, to a stable temperature below 6% water.

The mixture can optionally contain hydrolyzed mannan oligomers having a DP from 1 to 8 and, further, can contain cellulosic sugars derived from cellulosic coffee materials. When reconstituting powder, it is advisable to form as uniform and homogeneous a mix as possible and, when either employing concentrates or reconstituted powder, it is preferred to adjust the moisture content between above 4% to about 9% so that when the final formed product is cooled there is obtained a gasified coffee glass or foamed super-cool liquid.

The products are formed by preparing the mixture of coffee solids having above 4% to 9% water, heating the mixture to 60° C. to 130° C., more preferably 70° C. to 110° C. (most preferably 80° C. to 100° C.), injecting gas into the mixture to adjust density and forcing the mixture through a restricted area to shape it, cooling the mixture to a brittle condition and thereafter drying the mixture to a stable moisture content of 6% water or less. In a preferred embodiment the hot material leaving the restricted area after being shaped is stretched to increase its surface to mass ratio which allows rapid cooling to a brittle foamed coffee glass. This glass is then suitably reduced in size and dried to a stable moisture content of below 6% water.

Forming a gasified mixture helps improve final product solubility and lower the final density of the product. Such gasified mixtures are still capable of stretching on leaving the forming device although the degree of stretching is reduced. The material may also be aromatized under pressure prior to forming the cooled glass. Any of the gasified glasses can be combined to form novel coffee products.

DESCRIPTION OF THE INVENTION

In accordance with the present invention a coffee glass product is prepared by forming a mixture of 88% to 97%, preferably from 91% solids to below 96% solids and 3 to 12%, preferably above 4% to 9%, water at a temperature of from 60° to 130° C. The mixture is then injected with gas, preferably inert gas, in a confined area, aromatized if desired, and forced through a restricted area or die at pressures of up to 2500 pounds per square inch. The mixture is then rapidly cooled by liquid nitrogen, cold air or by pulling the gasified melt by means of a traveling belt or roller to reduce the thickness of the shape produced and to allow rapid cooling whereupon the cooled material or glass is suitably reduced in size and dried to a stable moisture content. This glass may then be combined with other coffees.

The coffee mixture can be prepared from coffee extract obtained by normal percolation by subjecting the extract to falling film evaporators or other suitable devices, to obtain a solids content of at least 88% and more preferably 91% or more. The solids content is adjusted to form a mixture which will form a super-cooled gasified coffee glass upon cooling. The coffee mixture can also be obtained by mixing dried coffee solids, spray-dried, freeze-dried or otherwise, with sufficient water to produce a moisture content up to 12%, more preferably between above 4% and 9%.

With sufficient mixing there is produced a homogeneous material which is similar to that obtained by concentration of coffee extract. The coffee mixture can also be prepared by adding a small amount of dry soluble coffee to concentrated coffee extract. In all cases the coffee solids obtained should have a glass transition temperature of between 30° C. to about 80° C.

By glass transition temperature, we mean the liquification upon heating through this region of a material in a glassy state to one in the fluid state. The transformation is indicated by a change in a second order thermodynamic quantity, such as the expansion coefficient or heat capacity. The change is due to the onset of extensive molecular motion which occurs in the transformation from a glass to a liquid. The change can be characterized by a glass transition temperature or Tg. Measurements of the dimensional stability of a material over a range of temperatures can be used to derive the Tg. A pentration thermogram as generated by the Thermomechanical Analyzer (manufactured by Perkin-Elmer) is used as the source of dimensional data. As described in the Applications Section of the Instruction Manual (Model TMS-2, publication #993-9246), Tg is identified as the temperature at which the first evidence of displacement of the penetration thermogram occurs from the pre-transition baseline.

This instant process, in addition to working well with conventionally extracted roasted and ground coffee extracts, can also be applied to those extracts which are obtained from coffee by heat, enzymatic, acid or base hydrolysis. For example, a portion of the coffee solids, may be derived from hydrolyzed mannan which forms oligomers having a DP anywhere from 1 to 8. These materials are generally obtained by high pressure, short time, high temperature treatment of wetted residual coffee grounds which cause the mannan to be hydrolyzed to relatively high molecular weight oligomers, having DP's up to 8. The coffee can also contain cellulosic sugars derived from the cellulosic components of coffee which are produced by the acid or base hydrolysis of such coffee solids. In any case, the addition of mannan oligomers and cellulosic derived coffee sugars does not produce such a reduction in glass transition temperature, which would result in a failure to produce a coffee glass of acceptable hygroscopicity.

The dry soluble coffee or concentrated extract used in this invention has a composition dry basis as follows:

|  | % | Preferred % |
|---|---|---|
| Total Carbohydrates | 15–50 | 30–40 |
| Reducing Sugars included in total carbohydrates | 5–20 | 5–15 |
| Protein | 5–15 | 6–10 |
| Alkyloids | 0–6 | 2–6 |
| Chlorogenic Acid | 2–35 | 5–15 |
| Other Acids | 2–12 | 4–8 |
| Ash | 2–16 | 5–9 |

Once the coffee mixture is prepared, it may be gasified by injecting into the mixture and uniformly blending various gases, such as nitrogen, carbon dioxide air or others, which will cause a reduction in the density of the coffee mixture and allow flexibility and control of the final coffee product density. Injection is accomplished by forcing the gas by pump or by regulating the pressure differences into the pressurized extruder chamber to control the flow rate of the gas prior to intricate mixing with the coffee melt. Gasification can also be accomplished by directly incorporating food grade foaming agents such as amomia bicarbonate, potassium bicarbonate, calcium carbonate and the likes up to 5%, preferably 0.5 to 2%, foaming agent is employed per dry weight of soluble coffee powder. Mixtures of gas and foaming agent may be exployed if desired to attain specific physical attributes. Such gasification also helps in producing improved coffee solubility and has an effect on lightening the color of the product, both useful when designing new forms of coffee products. Finally, use of inert gas protects any aromas added to the mixtures.

When preparing products having the appearance of freeze-dried soluble coffee, sufficient gas is added to the melt to give a final ground dry powder having a particle size of −8+24 U.S. screen, having a color of 20°–36° L. and density of 0.18 to 0.30 g/cc. Less gas is used to form a roasted and ground appearance than the product having a color of 15°–26° L. and 0.25–0.50 g/cc when ground and dried to a moisture below 6%.

In addition, aromas can be added, either with the gasification step, such as injecting the aromas into the mixture and then homogeneously blending the mixture. It is preferred to add the aromas and blend, either in the die or close thereto, to reduce thermal degradation of the aroma.

Aroma may be incorporated in the water or extract used as feed to the extruder to adjust the moisture content of the coffee mixtures prior to shaping.

The coffee mixture in a soft, homogeneous gasified hot confined state is then forced through an orifice or series of orifices so as to shape it. On exiting the orifices, the gasified melt expands at atmospheric conditions and the coffee is then quickly cooled and solidified. The volume of gas material or chemical introduced into the melt is controlled to produce the density desired once the melt is expanded, cooled and solidified. In a preferred embodiment of our invention, we preferred to form relatively thin strips of the coffee material by forcing the mixture through slits or other carefully designed orifices which produce a uniform strip of the material. This strip expands on exiting the orifice. The material is then directed to a belt which picks up the strip and may stretch it by traveling at a rate higher than the strip exiting from the extruder. The moving belt stretching the strip is a convenient way to further regulate the thickness of the coffee strip and to ensure rapid cooling of that strip.

In another preferred embodiment we extrude ropes of the expanded coffee and immediately cool with liquid gas or a cold tunnel to solidify the gasified coffee and trap aroma.

The strip or other gasified coffee glass produced is homogeneous, opaque, brown in color and consists substantially of coffee in a homogeneous, super-cooled liquid or glass condition. The cooled gasified product can then be broken into the desired size and further dried to stabilize the product for storage. The gasified product can be sized to resemble other coffee products. The brown color is much closer to the color of dry soluble coffee than is ungasified coffee glass and, in fact, can be made into products that closely resemble products on the market today. In general, the products exiting the die may have moisture contents above 6% and must be dried to stable moisture contents below 6%, preferably below 5%.

The properties of the final coffee glass are easily changed by regulating the amount of inert gas incorporated into the melt prior to forming it. Either a metering pump or a regulated pressure differential is used to force a controlled volume of gas into the hot melt. The resulting cooled gasified coffee glass has a freeze-dried or roasted and ground color depending on the amount of gas, preferably carbon dioxide, incorporated in the melt.

For gasified ropes or thick slabs, stretching is not used since rapid cooling by cooling tunnel or other means is used to set the form leaving the extruder and maintaining the expanded structure.

This process is very useful for aromatizing and gasifying the coffee glass by allowing incorporation of the aroma and gas just prior to extrusion and then effecting very rapid cooling as the extrudate leaves the die.

The gasified coffee glass is particularly valuable for protecting and stabilizing natural and synthetic aromas which may be added to the coffee. Apparently, the high solids content of the gasified molten liquid phase under pressure allows rapid formation of a homogeneous aromatized mixture which can be immediately shaped and cooled to affect a transition from coffee melt to coffee glass with less than 50% loss of volatiles, more preferably 70%, and most preferably less than 80% loss of volatiles, while minimizing flavor degradation of the coffee. The inert gas incorporated in the aromatized melt further protects the aroma and flavor while providing density control and improved solubility for the product.

Thin flakes of coffee glass can be prepared in a manner taught in the copending patent application Ser. No. 07/231,811, filed Aug. 12, 1988 herein incorporated by reference. These flakes can be mixed with the foamed glass of this invention and agglomerated to produce novel products.

EXAMPLE 1

Two granulated extruded rope products were made from spray-dried powder on Werner Pfleiderer ZSK 57 mm twin-screw extruder. The variants were a freeze-dried look-alike and a roasted and ground look-alike.

Freeze Dried Look-alike

Carbon dioxide gas was injected into the extruder barrel to control density, color, and solubility. The key control variables in this operation were moisture, temperature, gas to coffee ratio, and the degree of mixing. The extruder screw profile chosen was one which provided a good deal of mixing while it also maintained at a relatively low temperature profile (See extruder condition). The moisture target of 7.0% was selected in view of the fact that spray-dried coffee contains no hydrolyzate solids. This moisture level, along with the controlled temperature profile, yielded a melt with the right viscosity for dispersing the $CO_2$ gas and for good expansion at the die. The product exits with minimal shrinkage and collapses during cooling. Thus, a very porously-structured rope was formed which could be ground into a freeze-dried look-alike form having a low density and a good degree of solubility.

The die was a 45°, variable-face, strand die with two 3/16" diameter holes. As the rope strands exited the die, they expanded to about 5/8" diameter and were drawn away at a speed equivalent to the die exit speed on a wire mesh conveying belt. (It is interesting to note that upon leaving the die, the ropes lost about 1% moisture.) While on the belt, they were cooled with a spray of liquid nitrogen. At the end of the belt, the ropes were laid out on a stainless steel table for further cooling (5 to 10 minutes) before being broken up into 2 to 6 inch pieces and bagged. They were ground in the Urschel Model N grinder (4 passes), sized in the 18" Sweco (−8+24 U.S. screens), and dried in the Jeffrey fluid-bed afterdryer (one pass).

| Extruder Conditions | | |
|---|---|---|
| Temperature Profile Barrel # | Jacket Temp., °F. | Barrel Temp., °F. |
| 1, | City Water, 65 | 74 |
| 2 & 3 | Chiller, 40 | 63, 92 |
| 4, | Heater #1, 195 | 222 |
| 5 & 6 | Heater #2, 195 | 212 |
| 7 & 8 | Heater #3, 195 | 209 |
| 9 & 10, | Heater #4, 195 | 215°, 210 |
| Powder Feed Rate | 66 lb/hr | |
| Die Temp. | 200–207° F. | |
| Liquid Injection | 29 gm/min of 20% con-extract, front of barrel #3 | |
| Gas Injection | 2700 cc/min of $CO_2$ gas, front of barrel #6 | |
| Gas Injection Pressure | 220 PSIG | |
| Screw Speed | 100 RPM | |
| Screw Torque | 70.8% | |
| Die Pressure | 295 PSIG | |

Roasted and Ground Look-alike

Extruder conditions were the same as for the freeze-dried look-alike, except for the gas to coffee ratio. In order to attain a slightly speckled, darker product, the gas rate was controlled to a very low flow rate (25 cc/m). This resulted in a much denser rope than the freeze dried, with far less porosity. It also caused the temperature in the latter extruder barrels to rise slightly (+10° F). Moisture loss upon exiting the die was 0.5%. This is to be expected since the porosity is less and since there is much less $CO_2$ gas escaping which aids in moisture removal.

Due to the smaller size desired for the R&G look-alike, five passes were required through the Urschel grinder as shown below:

| Pass | Roller Setting | Guard Clearance |
|---|---|---|
| 1st | 2 | 3/16" |
| 2nd | 1 | 3/16" |
| 3rd | 0 | 3/16" |
| 4th | 0 | 1/8" |
| 5th | 0 | minimum |

The product was sized in the 18" Sweco screener using −14/+20 U.S. screens. Due to the lower porosity of the R&G sample, two passes through the Jeffrey fluid-bed after dryer were required to reduce the moisture to an acceptable level.

| Jeffrey Fluid-bed Afterdryer Conditions | | |
|---|---|---|
| Condition | Freeze Dried | Roasted & Ground |
| Drying Air Temp., °F. | 190 | 190 |
| Drying Air Velocity ft/min. | 55 | 55 |
| Feed Rate, lb/hr | 60 | 60 |
| Residence Time, Drying, sec. | 135 | 135 |
| Cooling Air Temp., °F. | 65 | 65 |
| Residence Time, Cooling, sec. | 60 | 60 |
| Moisture, In. % $H_2O$ | 6.16 | 6.50 |
| Moisture, Out, % $H_2O$ | 4.01 | 5.58, 1st pass 5.05, 2nd pass |

Product Evaluation and Analysis

Organoleptic and Visual

The finished products were tested to evaluate the effects of the various processing steps on flavor quality. They were described as being similar in character to the spray-dried powder which was used to produce them. The consensus of the panel was that the products met all expectation for flavor, quality and appearance.

| Product Attributes | | | |
|---|---|---|---|
| | Density g/cc | Moisture | Color °L |
| Freeze Dried Look-alike: | 0.21 | 4.01 | 28.0 |
| Roasted & Ground Look-alike: | 0.41 | 5.05 | 18.0 |

NOTE:
spray dried powder used in this example physicals are:
Density: 0.25 g/cc
Moisture: 2.75%

EXAMPLE II

A series of investigations were made using the Werner-Pfleiderer ZSK 57 mm twin-screw extruder using an 18-inch laminar die having a 0.005 (5 mils) die opening or a two holed die. The configuration of the extruder is given in the following table which gives the temperature profile in each of the 10 sections of the extruder and the position of the coffee feed, gasification, water or extract addition and a general description of the product.

| Run | Extruder Barrel Section Temperature °F |||||||||| Feed Rate | Coffee H₂O Content | Water Addition Rate | Product Temp. at die exit | Screw Speed | Die Pressure | CO₂ Gas Addition | Torque | Product Moisture Content | Remarks |
| | 1 | 2 | 3 | 4 | 5 | 6 | 7 | 8 | 9 | 10 | Lbs./hr. | % | lbs./hr. % | °F. | RPM | PSIG | cc/min. | % | % H$_2$O | |
|---|---|---|---|---|---|---|---|---|---|---|---|---|---|---|---|---|---|---|---|---|
| (A) | •74 | 89 | 94•• | — | 208 | 198 | 214 | 212••• | 209 | — | 207 | 138.1 | 2.5 | 3.31 2.39 | 200 | 97.5 | 214.5 | 1500 | 40.6 | 4.8 | Run A — Gasified sheet not as elastic, but could be drawn down at 30 ft/min. Color was far lighter. |

The following two runs were made using a die having two holes:

| Run | 1 | 2 | 3 | 4 | 5 | 6 | 7 | 8 | 9 | 10 | Feed Rate Lbs./hr. | Coffee H₂O Content % | Water Addition Rate lbs./hr. % | Product Temp. at die exit °F. | Screw Speed RPM | Die Pressure PSIG | CO₂ Gas Addition cc/min. | Torque % | Product Moisture Content % H$_2$O | Remarks |
|---|---|---|---|---|---|---|---|---|---|---|---|---|---|---|---|---|---|---|---|---|
| (B) 3/16 inch holes | •88 | 63 | 67•• | 221 | 215 | 219••• | 215 | — | 213 | 215 | 59.4 | 3.37 30% extract | 4.1 6.9 | 205–210 | 105 | 155 | 1500 | 69 | 6.7 | Run B — Long continuous strands of soluble coffee when granulated −8 + 24 U.S. mesh having a freeze-dried appearance, density of 0.275 and 28 color. |
| (C) 1/8 inch holes | | | | | •66 | 68• | 198••• | 200 | 207 | 207 | 84.9 | 4.5 | 3.57 4.2 | 210 | 61 | 245 | small amount of gas | 69 44.7 | 2.3 | Run C — Long continuous ropes of solid coffee were granulated to −10 +20 U.S. mesh having a roasted and ground appearance, dark color and 0.5 g/cc density |
| (D) | 82• | 43 | 57 | 229•• | 208 | 214 | 215 | 215 | 216 | 228 | 66 | 1.9 | 2.4 55 | 229 | 75 | 350 | none | 86 | 5.5 | Run D — 1% Ammonium bicarbonate uniformly mixed with the spray-dried coffee feed to the extruder. There was recovered a long continuous strand of soluble coffee when granulated −8 +20 U.S. mesh, having a freeze-dried appearance, density on 0.27 and 29 color. |
| (E) | | | | | 68• | 66 | 67••• | 199 | 203••• | 206 | 85 | 4.7 | 3.6 4.2 | 210 | 61 | 236 | 2000 | 39 | 5.93 | Run E — Soluble coffee powder is mixed with 5% colloidal roasted and ground coffee to produce long continuous strands of soluble coffee having a freeze-dried appearance. |

Remarks - location of:
•Feed
••water addition
•••water addition
* Decomposition of Ammonium bicarbonate produced gas which was mixed into the coffee melt in the extruder and produced an exhanded coffee melt.

What is claimed is:

1. A method of forming a coffee glass product comprising:
   (a) forming a mixture of from 88% to 97% soluble, total coffee derived solids, 3% to 12% water, and up to 5% by weight, based on the weight of the coffee solids, of a food grade foaming agent;
   (b) adjusting the mixture temperature to 60° C. to 130° C. to form a melt;
   (c) effecting foaming of said foaming agent to gasify said melt in a confined area to form a soft, homogeneous, gasified melt in a hot, confined state;
   (d) forcing the gasified melt under pressure through an orifice to shape the gasified melt;
   (e) rapidly cooling the gasified melt leaving the orifice to form a gasified homogeneous coffee glass; and
   (f) recovering the gasified homogeneous gasified glass at a stable moisture content below 6%.

2. The method of claim 1 wherein the mixture contains 91% to about 96% coffee solids and about 4% to 9% water in step (a).

3. The method of claim 1 which further includes adding flavor and/or aroma prior to shaping the melt.

4. The method of claim 1 wherein the melt leaving the orifice is stretched while it is being rapidly cooled.

5. The method of claim 1 wherein the mixture is heated to 70° C. to 100° C.

* * * * *